(12) United States Patent
Yamaguchi et al.

(10) Patent No.: US 9,227,453 B2
(45) Date of Patent: Jan. 5, 2016

(54) FLAME-RETARDANT LAMINATE AND FLAME-RETARDANT ADHESIVE SHEET

(71) Applicant: LINTEC Corporation, Tokyo (JP)

(72) Inventors: Seitaro Yamaguchi, Tokyo (JP); Kenji Harada, Tokyo (JP); Yumiko Amino, Tokyo (JP); Yoshitomo Ono, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 14/412,209

(22) PCT Filed: Aug. 16, 2013

(86) PCT No.: PCT/JP2013/072033
§ 371 (c)(1),
(2) Date: Dec. 31, 2014

(87) PCT Pub. No.: WO2014/038366
PCT Pub. Date: Mar. 13, 2014

(65) Prior Publication Data
US 2015/0174938 A1   Jun. 25, 2015

(30) Foreign Application Priority Data

Sep. 6, 2012 (JP) .................................. 2012-196466

(51) Int. Cl.
| | | |
|---|---|---|
| *B41M 5/00* | (2006.01) | |
| *B41M 5/52* | (2006.01) | |
| *C09K 21/12* | (2006.01) | |
| *C09J 201/00* | (2006.01) | |
| *C09J 7/02* | (2006.01) | |
| *C08K 5/523* | (2006.01) | |
| *C09J 11/06* | (2006.01) | |
| *C08K 5/00* | (2006.01) | |
| *C08K 5/49* | (2006.01) | |
| *C08K 3/22* | (2006.01) | |
| *C09J 133/08* | (2006.01) | |

(52) U.S. Cl.
CPC ........... *B41M 5/5272* (2013.01); *B41M 5/5218* (2013.01); *B41M 5/5254* (2013.01); *B41M 5/5281* (2013.01); *C08K 5/523* (2013.01); *C09J 7/0296* (2013.01); *C09J 11/06* (2013.01); *C09J 201/00* (2013.01); *C09K 21/12* (2013.01); *C08K 5/0066* (2013.01); *C08K 5/49* (2013.01); *C08K 2003/2237* (2013.01); *C09J 133/08* (2013.01); *C09J 2201/162* (2013.01); *C09J 2203/334* (2013.01); *C09J 2205/102* (2013.01); *C09J 2205/106* (2013.01); *C09J 2433/00* (2013.01); *C09J 2433/006* (2013.01); *C09J 2467/006* (2013.01); *C09J 2475/006* (2013.01); *Y10T 428/265* (2015.01)

(58) Field of Classification Search
CPC ............. B41M 5/5272; B41M 5/5218; B41M 5/5254; B41M 5/5281; C09J 7/0296; C09J 11/06; C08K 5/523
See application file for complete search history.

(56) References Cited

U.S. PATENT DOCUMENTS

| | | | |
|---|---|---|---|
| 2006/0251890 A1* | 11/2006 | Lane et al. | 428/343 |
| 2008/0090075 A1* | 4/2008 | Kondo et al. | 428/344 |

FOREIGN PATENT DOCUMENTS

| | | |
|---|---|---|
| JP | 2002-275438 | 9/2002 |
| JP | 2002-321452 | 11/2002 |
| JP | 2004-243760 | 9/2004 |
| JP | 2010-265345 | 11/2010 |

OTHER PUBLICATIONS

International Search Report PCT/JP2013/072033 dated Nov. 19, 2013.

* cited by examiner

*Primary Examiner* — Betelhem Shewareged
(74) *Attorney, Agent, or Firm* — Young & Thompson

(57) ABSTRACT

A flame-retardant laminate 10 having a substrate 11 and a print-image-receiving layer 12 stacked on the substrate 11, is characterized in that the substrate 11 has a flame resistance equivalent to VTM-0; and the print-image-receiving layer 12 contains a resin and titanium oxide and no halide; exhibits a percent mass retention of 50% or higher as determined at 600° C. through thermal mass analysis; and has a thickness of 10 μm or less.

9 Claims, 1 Drawing Sheet

FLAME-RETARDANT LAMINATE AND FLAME-RETARDANT ADHESIVE SHEET

TECHNICAL FIELD

The present invention relates to a flame-retardant laminate and to a flame-retardant adhesive sheet for use as a heat-resistant label. More particularly, the invention relates to a flame-retardant laminate and to a flame-retardant adhesive sheet, each having a flame-retardant print-image-receiving layer which exhibits excellent frame resistance, high substrate adhesion property, and suitable printing performance.

BACKGROUND ART

Hitherto, a conventional adhesive sheet has been used as a management or display label affixed onto electronic parts or the like. However, in recent years, demand has arisen for electronic parts meeting high flame retardant standards. Thus, such a management label is required to have high flame resistance.

Under such circumstances, a substrate of an adhesive sheet which is used as the aforementioned label or an adhesive used therein has come to be made of various flame-retardant materials developed through different techniques. However, even when a substrate made of a flame-retardant material is employed, in the case where a coating layer made of a material such as polyester or polyurethane is employed as a print-image-receiving layer, the flame resistance of the label provided therefrom problematically decreases.

There has been known a heat-resistant coating layer for receiving printed images, the layer containing an inorganic powder and an organic binder in specific amounts (see Patent Document 1). Although the coating layer has heat resistance, flame resistance of the coating layer is not ensured.

Another print-image-receiving layer made from halo-polyolefin or polyvinyl chloride has excellent flame resistance and printability. However, due to presence of halogen, electronic circuits are damaged by corrosion and halogen-containing gas, resulting in a malfunction of the electronic parts. Therefore, such a print-image-receiving layer encounters difficulty in employment as a management label affixed onto electronic elements, which is problematic. In addition, a toxic gas may generate from halogen, and such a toxic gas is also problematic when the print-image-receiving layer is used as a label other than a management or display label affixed onto electronic parts.

PRIOR ART DOCUMENTS

Patent Documents

Patent Document 1: Japanese Patent Application Laid-Open (kokai) No. 2002-275438 (paragraph [0005] and others)

SUMMARY OF THE INVENTION

Problems to be Solved by the Invention

The present invention has been conceived under such circumstances. Thus, an object of the present invention is to provide a flame-retardant laminate and a flame-retardant adhesive sheet, each having a print-image-receiving layer which contains no halide and which exhibits excellent printability, and having a flame retardant characteristic.

Means for Solving the Problems

The present inventors have conducted extensive studies on a print-image-receiving layer particularly for use as a flame-retardant element, and have found that a print-image-receiving layer which contains a resin and titanium oxide and no halide; which exhibits a percent mass retention of 50% or higher as determined at 600° C. through thermal mass analysis; and which has a thickness of 10 μm or less can be used as a management label of an electronic element even in the absence of a halide and exhibits excellent printability and a flame resistance equivalent to VTM-0. The present invention has been accomplished on the basis of this finding.

Accordingly, the present invention provides a flame-retardant laminate comprising a substrate and a print-image-receiving layer stacked on the substrate, characterized in that:

the substrate has a flame resistance equivalent to VTM-0; and the print-image-receiving layer contains a resin and titanium oxide and no halide; exhibits a percent mass retention of 50% or higher as determined at 600° C. through thermal mass analysis; and has a thickness of 10 μm or less.

In the flame-retardant laminate, the resin is preferably at least one species selected from the group consisting of a polyurethane resin, a polyester resin, an acrylic resin, and a modified product of any of these.

The present invention also provides a flame-retardant adhesive sheet, characterised by comprising the aforementioned flame-retardant laminate, and an adhesive layer stacked on the substrate on the side opposite the print-image-receiving layer, wherein the adhesive layer contains at least one species selected from the group consisting of a phosphate ester-base flame retardant, a condensed phosphate ester-base flame retardant, and an ammonium phosphate-base flame retardant, and no halogen-containing flame retardant.

Effects of the Invention

The present invention enables provision of a flame-retardant laminate and a flame-retardant adhesive sheet, each of which can be used as a management label of an electronic element even in the absence of a halide and exhibits excellent printability and flame resistance.

MODES FOR CARRYING OUT THE INVENTION

Embodiments of the present invention will next be described in detail.

Figure 1:
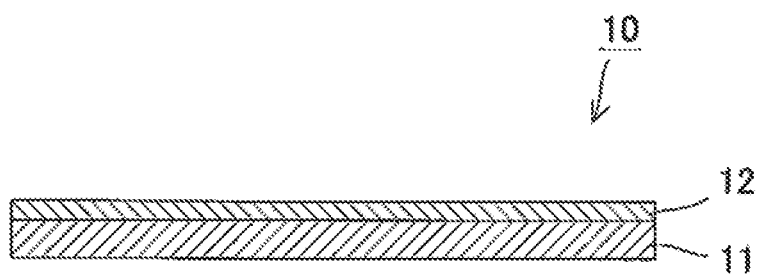
FIG. 1 A cross-section of a flame-retardant laminate according to an embodiment of the present invention.

FIG. 1 shows an embodiment of the flame-retardant laminate according to the present invention.

As shown in FIG. 1, in the present invention, a flame-retardant laminate 10 is formed of a substrate 11, and a print-image-receiving layer 12 stacked on the substrate 11. The substrate 11 has a flame resistance equivalent to VTM-0, and the print-image-receiving layer 12 contains a resin and titanium oxide and no halide, exhibits a percent mass retention of 50% or higher as determined at 600° C. through thermal mass analysis, and has a thickness of 10 μm or less.

In the present invention, the substrate has a flame resistance equivalent to VTM-0. More specifically, the substrate is given a flame resistance of VTM-0 in a test in accordance with the UL 94 standards. In consideration of use as a management label of an electronic element, the substrate contains no halogen-containing flame retardant.

Specific examples of the substrate include a substrate made of a flame-retardant resin selected from among, for example, a polyimide-base resin, a polyaramid-base resin, a polyphenylene sulfide-base resin, a polyether-ketone-base resin, and a nylon-base resin; a substrate formed of a sheet made of a polyester-base resin (e.g., polyethylene terephthalate (PET)) or a polycarbonate-base resin, the sheet being coated on each side with the aforementioned flame-retardant resin; a substrate made of a mixture prepared by adding the aforementioned flame-retardant resin to a polyester-base resin or a polycarbonate-base resin; a substrate formed of a resin prepared by kneading the aforementioned flame-retardant resin, a polyester-base resin, or a polycarbonate-base resin with a flame retardant other than a halogen-containing flame retardant (e.g., a phosphate ester-base flame retardant, a condensed phosphate ester-base flame retardant, or an ammonium phosphate-base flame retardant); and a substrate formed of a sheet made of a polyester-base resin (e.g., polyethylene terephthalate (PET)) or a polycarbonate-base resin, the sheet being coated on each side with a resin containing the aforementioned flame retardant other than a halogen-containing flame retardant.

No particular limitation is imposed on the thickness of the substrate, and it is appropriately tuned in accordance with various factors. However, the thickness is generally 10 to 300 μm, preferably 15 to 200 μm, in consideration of adaptability to a label. In order to enhance adhesion to the print-image-receiving layer stacked thereon, the substrate may optionally be subjected to a port treatment such as roughening (e.g., sandblast or solvent treatment), corona discharge treatment, ozone-UV irradiation, flame treatment, chromating, or hot air treatment.

The print-image-receiving layer disposed on one surface of the aforementioned substrate contains a resin and titanium oxide and no halide, exhibits a percent mass retention of 50% or higher as determined at 600° C. through thermal mass analysis, and has a thickness of 10 μm or less.

No particular limitation is imposed on the resin, so long as it works as a binder, and a variety of resins may be employed. From the viewpoints of heat resistance, printing performance, and other factors, specific examples of preferred resins include a polyurethane-base resin, a polyester-base resin, an epoxy resin, an acrylic resin, and a modified product of any of these.

The titanium oxide particles contained in the print-image-receiving layer preferably have a mean particle size of 0.1 to 3.0 μm. When the mean particle size is 0.1 μm or greater, the print-image-receiving layer maintains sufficient whiteness, to thereby ensure a sufficient contrast ratio (printed-non-printed area ratio), which is required particularly in thermal-transfer printing. In addition, the friction coefficient between the print-image-receiving layer and a thermal-transfer ribbon can be reduced, to thereby attain sufficient lubrication therebetween, whereby irregular printing is suppressed. When the mean particle size is 3.0 μm or less, a printing failure is suppressed.

The print-image-receiving layer may further contain, in addition to titanium oxide, an additional inorganic powder. Examples of the inorganic powder include powders of silicon carbide, boron nitride, calcium carbonate, aluminum oxide, silicon oxide, and zirconium oxide; silver powder, gold powder, and iron powder. These inorganic powders have high heat resistance and may be used singly or in combination of two or more species. In consideration of printing performance, these inorganic powders more preferably have a mean particle size of 0.15 to 1.5 μm, particularly preferably 0.2 to 1.0 μm.

No particular limitation is imposed on the titanium oxide content of the print-image-receiving layer of the present invention, so long as the formed print-image-receiving layer ensures favorable printing and exhibits a percent mass retention of 50% or higher as determined at 600° C. through thermal mass analysis. However, the titanium oxide content is preferably 20% or higher, more preferably 40% or higher, particularly preferably 60% or higher.

In the case where an additional inorganic powder is employed, no particular limitation is imposed on the additional inorganic powder content, so long as the formed print-image-receiving layer ensures favorable printing and exhibits a percent mass retention of 50% or higher as determined at 600° C. through thermal mass analysis.

The aforementioned print-image-receiving layer of the flame-retardant laminate of the present invention exhibits a percent mass retention of 50% or higher as determined at 600° C. through thermal mass analysis. In a specific procedure, a sample having a predetermined mass is heated under nitrogen to 600° C. at a temperature elevation rate of 20° C./min, and the mass of the remaining sample is measured. The percent mass retention (%), calculated by the following formula, is 50% or higher.

Percent mass retention (%)=(sample mass after heating)/(sample mass before heating)

In such a thermal mass analysis, inorganic material, carbonized resin, and other residues remain after heating. The greater the total amount of inorganic material and carbonized products, the higher the flame resistance. Thus, when the percent mass retention as determined at 600° C. is 50% or higher, sufficient flame resistance is attained. Specifically, a flame resistance almost equivalent to VTM-0, and furthermore, a flame resistance equivalent to VTM-0, can be attained. The percent mass retention is preferably 60% or higher, more preferably 65% or higher.

Meanwhile, there has conventionally been accepted, by those skilled in the art, a technique of incorporating a halogen-containing resin to a substrate, for imparting flame resistance to the substrate. However, the present inventors have found that, when a resin or other ingredients of the print-image-receiving layer are carbonized or converted, the products increase the percent mass retention as determined through thermal mass analysis at 600° C., whereby flame resistance can be enhanced. The inventors have also found that the flame resistance can be controlled by the percent mass retention as determined through thermal mass analysis at 600° C. The present invention has been accomplished on the basis of these findings.

The print-image-receiving layer of the present invention may be formed through the following procedure. Firstly, a precursor or a monomer or monomers for forming the aforementioned resin is added to an appropriate solvent with a curing agent, a polymerization initiator, or the like, titanium oxide, and an optional inorganic powder, to thereby prepare a coating liquid. The coating liquid is applied onto one surface of the substrate through a known technique, for example, bar coating, knife coating, roller coating, blade coating, die coating, or gravure coating, and the applied liquid is cured by heating.

The print-image-receiving layer of the present invention has a thickness of 10 μm or less for attaining a flame resistance of interest. In contrast, no particular limitation is imposed on the lower limit of the thickness of the print-image-receiving layer, so long as the layer attains a function of interest. The layer preferably has such a thickness that the brightness can be attained so that a sufficient contrast between the printed and the non-printed area, which is required particularly in thermal-transfer printing is ensured. Specifically, the thickness is preferably 2 μm or more, more preferably 3 μm or more, particularly preferably 5 μm or more.

The brightness is preferably adjusted to 50 or higher, more preferably 60 or higher, particularly preferably 65 or higher. The brightness of the print-image-receiving layer is measured by means of a color difference spectrometer (model NF777, product of Nippon Denshoku Industries Co., Ltd.) in accordance with JIS P8123.

The aforementioned flame-retardant laminate of the invention having a substrate and a print-image-receiving layer contains no halide and thus can be used as a management label of electronic elements. The laminate of the invention, which attains suitable printability and excellent flame resistance, can be employed in a variety of printing processes such as gravure printing, ink-jet printing, and thermal-transfer printing.

The flame-retardant laminate of the present invention may be provided with an adhesive layer stacked on the substrate on the side opposite the print-image-receiving layer, to thereby provide a flame-retardant adhesive sheet.

Figure 2:
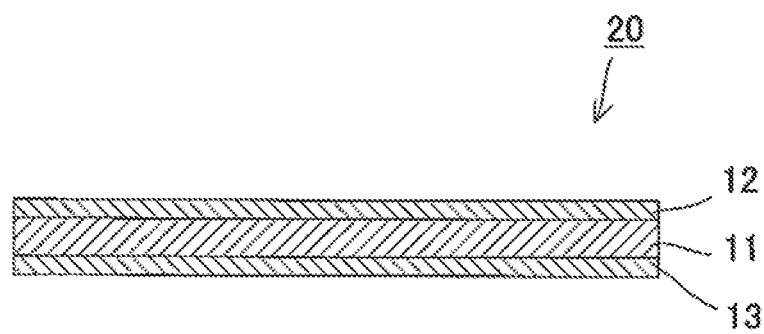
FIG. 2 A cross-section of a flame-retardant adhesive sheet according to an embodiment of the present invention.

FIG. 2 shows an embodiment of the flame-retardant adhesive sheet according to the present invention. As shown in FIG. 2, a flame-retardant adhesive sheet 20 includes a substrate 11, a print-image-receiving layer 12 disposed on one surface of the substrate, and an adhesive layer 13 disposed on the substrate 11 on the side opposite the print-image-receiving layer 12.

No particular limitation is imposed on the material of the adhesive serving as a base agent of the adhesive composition for forming the adhesive layer 13. The adhesive may be appropriately selected from known adhesives, for example, an acrylic adhesive containing a base polymer ((meth)acrylate-base (co)polymer) and a cross-linking agent, a rubber-base adhesive, a silicone-base adhesive, a polyurethane-base adhesive, and a polyester-base adhesive. Among them, an acrylic adhesive is particularly preferred. These adhesives may be used singly or in combination of two or more species.

The acrylic adhesive preferably contains a (meth)acrylate ester copolymer having a weight average molecular weight of 300,000 or higher as a resin component, and a cross-linking agent. One preferred example of the aforementioned (meth)acrylate ester copolymer a copolymer of a C1 to C20 alkyl (meth)acrylate ester, a monomer having a functional group including active hydrogen, and another monomer which may be optionally employed. Examples of the C1 to C20 alkyl (meth)acrylate ester include methyl (meth)acrylate, ethyl (meth)acrylate, propyl(meth)acrylate, butyl (meth)acrylate, pentyl(meth)acrylate, hexyl(meth)acrylate, cyclohexyl (meth)acrylate, 2-ethylhexyl(meth)acrylate, isooctyl(meth)acrylate, decyl(meth)acrylate, dodecyl(meth)acrylate, myristyl(meth)acrylate, palmityl(meth)acrylate, and stearyl (meth)acrylate. These monomers may be used singly or in combination of two or more species. Examples of the monomer having a functional group including active hydrogen include hydroxyalkyl(meth)acrylate esters such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, and 4-hydroxybutyl (meth)acrylate; acrylamides such as acrylamide, methacrylamide, N-methylacrylamide, N-methylmethacrylamide, N-methylolacrylamide, and N-methylolmethacrylamide; monoalkylaminoalkyl(meth)acrylates such as monomethylaminoethyl(meth)acrylate, monoethylaminoethyl(meth)acrylate, monomethylaminopropyl(meth)acrylate, and monoethylaminopropyl(meth)acrylate; and ethylenic unsaturated carboxylic acids such as acrylic acid, methacrylic acid, crotonic acid, maleic acid, itaconic acid, and citraconic acid. These monomers may be used singly or in combination of two or more species.

Examples of the optional monomer which is optionally employed in the acrylic adhesive include vinyl esters such as vinyl acetate and vinyl propionate; olefins such as ethylene, propylene, and isobutylene; styrenic monomers such as styrene and α-methylstyrene; dienic monomers such as butadiene and isoprene; nitrite monomers such as acrylonitrile and methacrylonitrile; and N,N-dialkyl-substituted acrylamide such as N,N-dimethylacrylamide and N,N-dimethylmethacrylamide. These monomers may be used singly or in combination of two or more species.

No particular limitation is imposed on the (meth)acrylate ester copolymer employed as a resin component in the acrylic adhesive. The copolymer may foe a random copolymer, a block copolymer, or a graft copolymer. The molecular weight thereof is preferably 300,000 or higher as a weight average molecular weight, more preferably 350,000 to 2,500,000. When the molecular weight is lower than 300,000, the acrylic adhesive has poor heat resistance, and adhesion to a substrate may be insufficient. Notably, the weight average molecular weight is a polystyrene-reduced value measured through gel permeation chromatography (GPC).

No particular limitation is imposed on the cross-linking agent contained in the acrylic adhesive, and it may be appropriately selected from the cross-linking agents conventionally used in acrylic adhesives. Examples of the cross-linking agent include a polyisocyanate compound, an epoxy resin, a melamine resin, a urea resin, a dialdehyde, a metal chelate compound, a metal alkoxide, and a metal salt. Among them, a polyisocyanate compound is preferably used. Examples of the polyisocyanate compound include aromatic polyisocyanates such as tolylene diisocyanate, diphenylmethane diisocyanate, and xylylene diisocyanate; aliphatic polyisocyanates such as hexamethylene diisocyanate; alicyclic polyisocyanates such as isophorone diisocyanate and hydrogenated diphenylmethane diisocyanate; biuret forms and isocyanurate forms thereof; and adducts obtained by reaction with a low-molecule compound having active hydrogen such as ethylene glycol, propylene glycol, neopentyl glycol, trimethylolpropane, or castor oil. In the present invention, these cross-linking agents may be used singly or in combination of two or more species. The total amount thereof, which varies depending on the type of the cross-linking agent, is generally 0.01 to 20 parts by mass, with respect to 100 parts by mass of the aforementioned (meth)acrylate ester copolymer, preferably 0.1 to 10 parts by mass.

If needed, the acrylic adhesive may further contain a tackifier, an antioxidant, a UV-absorber, a photo-stabilizer, a softening agent, a silane coupling agent, a filler, or the like.

The rubber-base adhesive is preferably a natural rubber-synthetic polyisoprene-base adhesive, which has excellent heat resistance. An example of the silicone-base adhesive is an adhesive containing, as a main component, polymethylsiloxane or polyphenylsiloxane, and an optional cross-linking agent (e.g., a peroxide), a tackifier, a plasticizer, a filer, or the like.

In the flame-retardant adhesive sheet of the present invention, the adhesive layer preferably contains, in addition to the aforementioned adhesive, at least one species selected from the group consisting of a phosphate ester-base flame retardant, a condensed phosphate ester-base flame retardant, and am ammonium phosphate-base flame retardant, and no halogen-containing flame retardant. By virtue of such an adhesive layer, sufficient flame resistance can be attained. Specifically, a flame resistance almost equivalent to VTM-0, furthermore, a flame resistance equivalent to VTM-0, can be attained.

Examples of the phosphate ester-base flame retardant include trimethyl phosphate, triphenyl phosphate, tricresol phosphate, cresyl diphenyl phosphate, bisphenol A bis(diphenyl)phosphate, bisphenol A bis(dicresyl)phosphate, resorcinol bis(di-2,6-xylenyl)phosphate, and resorcinol bis(diphenyl)phosphate. Among them, bisphenol A bis(diphenyl)phosphate and resorcinol bis(di-2,6-xylenyl)phosphate are preferred, with bisphenol A bis(diphenyl)phosphate being particularly preferred.

The condensed phosphate ester-base flame retardant is prepared through condensation of compounds employed as the aforementioned phosphate ester-base flame retardant.

Examples of the ammonium phosphate-base flame retardant include an ammonium polyphosphate, and a mixture of an ammonium polyphosphate with isocyanuric acid or a derivative thereof.

In the flame-retardant adhesive sheet of the present invention, the adhesive may be directly applied onto the substrate, to thereby form the adhesive layer. In an alternative procedure, the adhesive is applied onto a peelable sheet, and the adhesive layer is disposed on the peelable sheet. The thus-formed laminate is attached to the substrate, to thereby transfer the adhesive layer to the substrate. In the latter case, if required, the peelable sheet may be attached without peeling, and the peelable sheet may be removed upon use of the label. The thickness of the adhesive layer attached to the substrate is generally about 5 to about 100 μm, preferably about 10 to about 60 μm.

Examples of the peelable sheet include paper substrates such as glassine paper, coated paper, and cast-coated paper; laminate paper substrates prepared by laminating the paper substrates with a thermoplastic resin such as polyethylene; and plastic film substrates prepared by coating a polyester film (e.g., polyethylene terephthalate, polybutylene terephthalate, or polyethylene naphthalate) or a polyolefin film (e.g., polypropylene or polyethylene) with a releasing agent such as a silicone resin. No particular limitation is imposed on the thickness of the peelable sheet, but it is generally about 20 to about 150 μm.

The flame-retardant adhesive sheet of the present invention can be used as a management label of an electronic element even in the absence of a halide and exhibits excellent printability and flame resistance. Thus, the adhesive sheet can be employed in a variety of printing processes such as gravure printing, ink-jet printing, and thermal-transfer printing. Particularly, the adhesive sheet can be employed as a label to be affixed onto articles requiring flame resistance. A particularly suitable use thereof is a bar-code label. Generally, bar codes are printed on such a bar-code label by means of a printer of a thermal transfer mode, a dot matrix mode, an ink-jet mode, etc. The bar-code label of the invention can be applied to any of these.

EXAMPLES

The present invention will next be described in more detail by way of examples, which should not be construed as limiting the invention thereto.

Example 1

A print-image-receiving layer composition (white ink containing polyurethane-base resin; NB300 701 White (A), product of Dainichiseika Color & Chemicals Mfg. Co., Ltd.; titanium oxide content: 30%) (100 parts by mass) was mixed with a polyisocyanate compound (Lamic B hardener, product of Dainichiseika Color & Chemicals Mfg. Co., Ltd.; solid content: 30%) (5 parts by mass), to thereby prepare a coating liquid.

A polyester film coated both sides with polyimide (ZV30 #25, product of Toray Industries, Inc.) was used as a substrate. The coating liquid was applied onto a surface of the substrate by means of a Mayer bar coater and dried at 80° C. for 1 minute, to thereby form a print-image-receiving layer having a thickness of 5 μm. The laminate product was employed as a flame-retardant laminate.

Separately, a polyester film which had undergone peeling treatment (SP-PET 381031, product of Lintec Corporation) was used as a substrate, and a print-image-receiving layer having a thickness of 5 μm was formed on a surface of the substrate in the same manner, to thereby provide a sample for thermal mass analysis.

Example 2

The procedure of Example 1 was repeated, except that a print-image-receiving layer composition (white ink containing polyurethane-base resin; Lamic F220 701 White (K-5), product of Dainichiseika Color & Chemicals Mfg. Co., Ltd.; titanium oxide content: 30%) was used instead of the print-image-receiving layer composition (white ink containing polyurethane-base resin; NB300 701 White (A), product of Dainichiseika Color & Chemicals Mfg. Co., Ltd., to thereby prepare a coating liquid.

In the same manner as employed in Example 1, a flame-retardant laminate and a sample for thermal mass analysis were produced by use of the coating liquid.

Example 3

The procedure of Example 1 was repeated, except that a print-image-receiving layer composition (white ink containing polyurethane-base resin; Lamic F220 SC-2 White (A), product of Dainichiseika Color & Chemicals Mfg. Co., Ltd.; titanium oxide content: 35%) was used instead of the print-image-receiving layer composition (white ink containing polyurethane-base resin; NB300 701 White (A), product of Dainichiseika Color & Chemicals Mfg. Co., Ltd.), to thereby prepare a coating liquid.

In the same manner as employed in Example 1, a flame-retardant laminate and a sample for thermal mass analysis were produced by use of the coating liquid.

Example 4

The procedure of Example 1 was repeated, except that a print-image-receiving layer composition (white ink containing polyurethane-base resin; Lamic F220 HC-2 White (A), product of Dainichiseika Color & Chemicals Mfg. Co., Ltd.; titanium oxide content: 40%) was used instead of the print-image-receiving layer composition (white ink containing polyurethane-base resin; NB300 701 White (A), product of Dainichiseika Color & Chemicals Mfg. Co., Ltd.), to thereby prepare a coating liquid.

In the same manner as employed in Example 1, a flame-retardant laminate and a sample for thermal mass analysis were produced by use of the coating liquid.

Example 5

The procedure of Example 4 was repeated, except that the thickness of the print-image-receiving layer was altered to 3 μm, to thereby produce a flame-retardant laminate and a sample for thermal mass analysis.

Example 6

The procedure of Example 4 was repeated, except that the thickness of the print-image-receiving layer was altered to 8 µm, to thereby produce a flame-retardant laminate and a sample for thermal mass analysis.

Example 7

The procedure of Example 4 was repeated, except that the thickness of the print-image-receiving layer was altered to 10 µm, to thereby produce a flame-retardant laminate and a sample for thermal mass analysis.

Example 8

The procedure of Example 4 was repeated, except that the thickness of the print-image-receiving layer was altered to 2 µm, to thereby produce a flame-retardant laminate and a sample for thermal mass analysis.

Example 9

An adhesive containing an acrylic adhesive (n-butyl acrylate/acrylic acid=90/10 (ratio by mass); weight average molecular weight: 600,000; solvent: ethyl acetate; and solid content: 27 mass %) (100 parts by mass (solid-base ratio), an isocyanate-base cross-linking agent (Coronate L, product of Nippon Polyurethane Industry Co., Ltd.; and solid content: 75 mass %) (1 part by mass), and a phosphate ester-base flame retardant (CR-741, product of Daihachi Chemical Industry Co., Ltd.) (80 parts by mass) were mixed together, to thereby prepare a coating liquid for adhesive.

The coating liquid was applied onto a peeling treatment surface of a polyester film which had undergone peeling treatment (SP-PET 381031, product of Lintec Corporation), to thereby form an adhesive layer having a thickness of 20 µm. The adhesive layer was dried and then bonded to the flame-retardant laminate produced in Example 1 on the side opposite the print-image-receiving layer, to thereby produce a flame-retardant adhesive sheet.

The same sample for thermal mass analysis as employed in Example 1 was used.

Comparative Example 1

The procedure of Example 1 was repeated, except that a print-image-receiving layer composition (white ink containing polyester cellulose-base resin; SF Primer No. 930 Mat White, product of DIC) was used instead of the print-image-receiving layer composition (white ink containing polyurethane-base resin; NB300 701 White (A), product of Dainichiseika Color & Chemicals Mfg. Co., Ltd.; solid content: 40%), to thereby prepare a coating liquid.

In the same manner as employed in Example 1, a laminate and a sample for thermal mass analysis were produced by use of the coating liquid.

Comparative Example 2

The procedure of Example 1 was repeated, except that a print-image-receiving layer composition (white ink; Poly S Dia DX-60 N White 110-Kai, product of Sakata Inx Corporation) was used instead of the print-image-receiving layer composition (white ink containing polyurethane-base resin; NB300 701 White (A), product of Dainichiseika Color & Chemicals Mfg. Co., Ltd.), to thereby prepare a coating liquid.

In the same manner as employed in Example 1, a laminate and a sample for thermal mass analysis were produced by use of the coating liquid.

Comparative Example 3

The procedure of Example 1 was repeated, except that a print-image-receiving layer composition (white ink; Poly S Pearl New DLO N White 110G, product of Sakata Inx Corporation) was used instead of the print-image-receiving layer composition (white ink containing polyurethane-base resin; NB300 701 White (A), product of Dainichiseika Color & Chemicals Mfg. Co., Ltd.), to thereby prepare a coating liquid.

In the same manner as employed in Example 1, a laminate and a sample for thermal mass analysis were produced by use of the coating liquid.

Comparative Example 4

The procedure of Example 1 was repeated, except that the thickness of the print-image-receiving layer was altered to 18 µm, to thereby produce a laminate and a sample for thermal mass analysis.

Test Example 1

Percent Mass Retention (Weight Measurement Before and after Heating)

Each sample for thermal mass analysis was cut into pieces having predetermined dimensions. The print-image-receiving layer was removed from each piece, to thereby provide measurement samples. The initial mass of each sample was measured. Subsequently, the measurement sample was heated under nitrogen to 600° C. at a temperature elevation rate of 20° C./min. After termination of heating, the mass of the remaining sample was measured.

The percent mass retention (%) was calculated by the following formula. Table 1 shows the results.

Percent mass retention (%)=(mass of the remaining sample)/(initial mass of the sample)

Test Example 2

Brightness

The brightness of the print-image-receiving layer of each laminate was measured by means of a color difference spectrometer (model NF777, product of Nippon Denshoku Industries Co., Ltd.) in accordance with JIS P8123. Table 1 shows the results.

Test Example 3

UL94 Vertical Burning Test

Each laminate was subjected to a vertical burning test according to UL 94, which is the standard for safety of flammability of plastic materials defined by Under Writers Laboratories Inc. UL94 VTM rank of each sample was determined. Table 1 shows the number of samples which passed the VTM-0 test.

Test Results

The laminates of Examples 1 to 9, each having a print-image-receiving layer exhibiting a percent mass retention of 67% or higher, were found to exhibit excellent flame resistance, which is equivalent to VTM-0 or almost equivalent to VTM-0. The laminate of Example 7, having a print-image-receiving layer exhibiting high percent mass retention but having a thickness as large as 10 μm, provided 4 samples which passed VTM-0, indicating that the laminate attained flame resistance slightly inferior to VTM-0. Therefore, the upper limit of the thickness of the print-image-receiving layer was found to be 10 μm.

The laminates of Examples 1 to 7, and 9, each having a print-image-receiving layer having a thickness of 3 μm or more, were found to exhibit a favorable brightness of 65 or higher. The laminate of Example 8, having a print-image-receiving layer thickness of 2 μm, was found to exhibit an insufficient brightness of 26, which is lower than 82.1, exhibited by the laminate having a print-image-receiving layer thickness of 3 μm. Although the brightness of Example 8 is acceptable for certain uses, use of the laminate of Example 8 is limited. Therefore, the thickness of the print-image-receiving layer is preferably 3 μm or greater.

TABLE 1

| | Thickness of print-image-receiving layer (μm) | Mass retention (%) | Brightness | UL94 vertical burning test (no. of passed samples/no. of tested samples) |
|---|---|---|---|---|
| Ex. 1 | 5 | 67.0 | 65.3 | VTM-0 (5/5) |
| Ex. 2 | 5 | 74.0 | 76.4 | VTM-0 (5/5) |
| Ex. 3 | 5 | 77.5 | 74.7 | VTM-0 (5/5) |
| Ex. 4 | 5 | 79.1 | 84.2 | VTM-0 (5/5) |
| Ex. 5 | 3 | 79.1 | 82.1 | VTM-0 (5/5) |
| Ex. 6 | 8 | 79.1 | 88.6 | VTM-0 (5/5) |
| Ex. 7 | 10 | 79.1 | 89.4 | VTM-0 (4/5) |
| Ex. 8 | 2 | 67.0 | 26.0 | VTM-0 (5/5) |
| Ex. 9 | 5 | 67.0 | 65.3 | VTM-0 (5/5) |
| Comp. Ex. 1 | 5 | 44.6 | 33.8 | Failure (0/5) |
| Comp. Ex. 2 | 5 | 34.7 | Not measured | Failure (0/5) |
| Comp. Ex. 3 | 5 | 49.9 | Not measured | Failure (0/5) |
| Comp. Ex. 4 | 18 | 67.0 | 89.2 | Failure (0/5) |

DESCRIPTION OF THE DRAWINGS 10 flame-retardant laminate
11 substrate
12 print-image-receiving layer
13 adhesive layer
20 flame-retardant adhesive sheet

The invention claimed is:

1. A flame-retardant laminate comprising a substrate and a print-image-receiving layer stacked on the substrate, wherein:
   the substrate has a flame resistance equivalent to VTM-0; and
   the print-image-receiving layer contains a resin and titanium oxide and no halide; exhibits a percent mass retention of 50% or higher as determined at 600° C. through thermal mass analysis; and has a thickness of 8 μm or less.

2. The flame-retardant laminate according to claim 1, wherein the resin is at least one species selected from the group consisting of a polyurethane resin, a polyester resin, an acrylic resin, and a modified product of any of these.

3. A flame-retardant adhesive sheet, comprising a flame-retardant laminate as recited in claim 1, and an adhesive layer stacked on the substrate on the side opposite the print-image-receiving layer, wherein the adhesive layer contains at least one species selected from the group consisting of a phosphate ester-base flame retardant, a condensed phosphate ester-base flame retardant, and an ammonium phosphate-base flame retardant, and no halogen-containing flame retardant.

4. A flame-retardant adhesive sheet, comprising a flame-retardant laminate as recited in claim 2, and an adhesive layer stacked on the substrate on the side opposite the print-image-receiving layer, wherein the adhesive layer contains at least one species selected from the group consisting of a phosphate ester-base flame retardant, a condensed phosphate ester-base flame retardant, and an ammonium phosphate-base flame retardant, and no halogen-containing flame retardant.

5. The flame retardant additive according to claim 1, wherein the print-image-receiving layer has the thickness of 3 to 8 μm.

6. The flame retardant additive according to claim 1, wherein the substrate is a polyester film coated on both sides with polyimide.

7. The flame retardant additive according to claim 1, wherein the print-image-receiving layer has a brightness of 50 or higher.

8. The flame retardant additive according to claim 1, wherein the print-image-receiving layer has a brightness of 60 or higher.

9. The flame retardant additive according to claim 1, wherein the print-image-receiving layer has a brightness of 65 or higher.

* * * * *